G. D. EMERSON.
Velocipede
No. 99,546.  Patented Feb. 8, 1870.
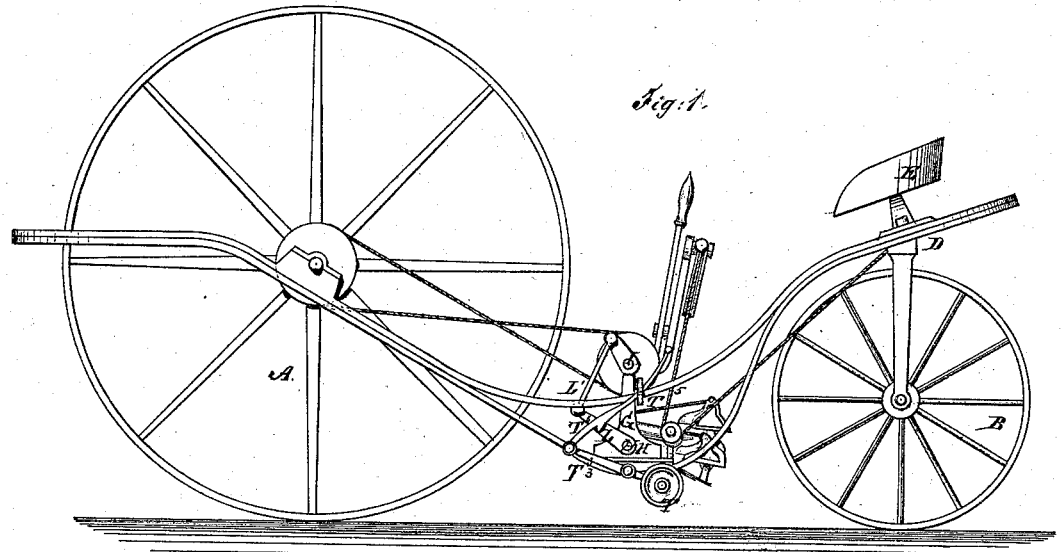
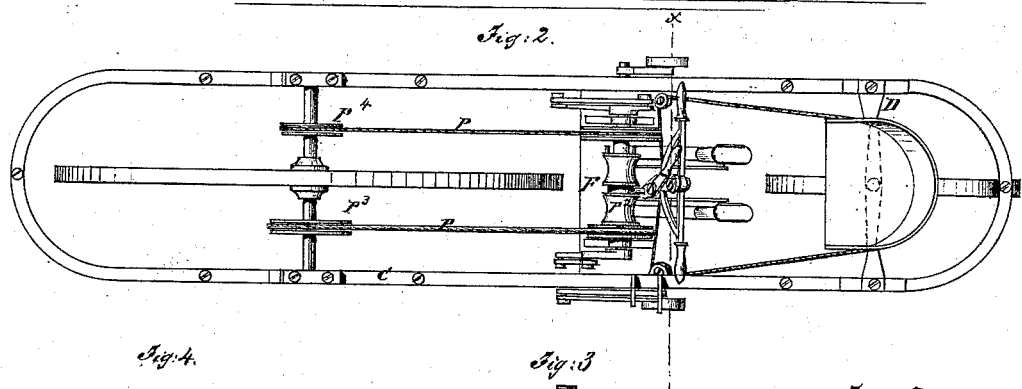
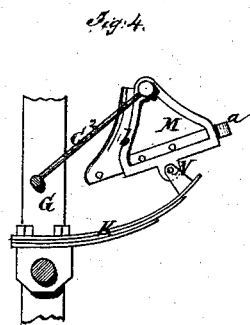
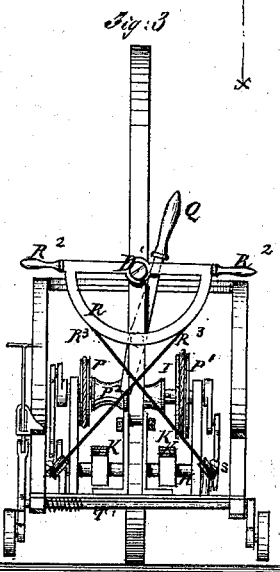
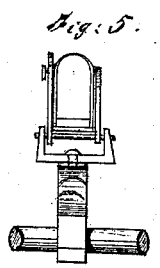
Witnesses:
Chas. Nida
Wm. F. Clark
Inventor:
G. D. Emerson
per
Attorneys.

United States Patent Office.

GEORGE D. EMERSON, OF CALUMET, MICHIGAN.

Letters Patent No. 99,546, dated February 8, 1870.

IMPROVEMENT IN VELOCIPEDE

The Schedule referred to in these Letters Patent and making part of the same

*To all whom it may concern :*

Be it known that I, GEORGE D. EMERSON, of Calumet, in the county of Houghton, and State of Michigan, have invented a new and useful Improvement in Velocipedes; and I hereby declare that the following is a full, clear, and exact description thereof, which will enable those skilled in the art to make and use the same, reference being had to the accompanying drawings, forming part of this specification.

This invention relates to improvements in velocipedes, and has for its object to provide a propelling-arrangement, whereby the operator may apply the whole force of his weight to the work ordinarily, and at times an additional force, by adding the force of his arms to the effect of his weight.

The invention comprises an improved spring-treadle motion, suspended upon the frame between the fore and hindermost wheels working a countershaft, from which belts communicate motion to the front wheel, under an arrangement for varying the same;

Also, an improved construction of stirrups or treadles and arrangement thereof, calculated to facilitate the application of the power of the full weight of the body, and applicable for propelling turning-lathes, and sewing and other light machinery;

Also, an improved arrangement for steering-apparatus;

Also, an attachment of adjustable side-balancing wheels, to be used when first setting into motion, to prevent the machines, when of the two-wheeled class, from falling; and Also, an improved arrangement of the frame, calculated to provide a strong and light frame of simple and cheap construction.

Figure 1 represents a side elevation of my improved velocipede;

Figure 2 represents a plan view of the same;

Figure 3 represents a transverse section, taken on the line $x\ x$ of fig. 2;

Figure 4 represents a side elevation of one of the treadles and spring-treadle levers; and Figure 5 represents a rear view of the same.

The improvements are applicable to machines of two or three wheels, but in this example I have represented a machine of only two wheels, A being the front or driving-wheel, and B, the rear and guiding-wheel.

The wheels are connected to a light wood frame, C, preferably having straight sides longitudinally, in the case of two-wheeled machines, and rounded ends completely surrounding both wheels, and elevated at the connection with the axles, and beyond, but considerably depressed at the centre, where the operating-mechanism is arranged for the purpose of bringing the centre of gravity as low as possible, for the purpose of balancing to better advantage.

This frame is made of two thin and flat bars of straight-grained and tough wood, capable of bending readily. One bar is placed above the other, and both connected by screws or rivets, except near the centre longitudinally, where the lower bar is bent downward considerably more than the upper one, which is made shorter, and springs across the said depressions, considerably above the bottoms thereof, for the purpose of bracing and stiffening the frame at this point, where the weight of the rider and the operating-devices is supported.

The shaft of the front wheel is provided with bearings on this frame at each end, and the rear wheel has a caster-arrangement, connected to a transverse bar, D, whereon a seat, E, is located.

A platform, F, is suspended upon the frame at the lowest point, whereon the bearings G, a rock-shaft, H, and a countershaft, I, are placed.

The rock-shaft is provided with a spring-treadle lever, K, and rocker-arms, L.

The spring-treadle arms carry, at their outer ends, stirrups M, pivoted thereto at N, and connected, by radius-bars O, to the posts G. The said stirrups are composed of soles $a$, metallic side plates or frames $b$, and uppers of leather or other flexible substance, and open at the heels for readily sliding the feet into them from behind.

The rocker-arms L have connecting-rods L', connected to cranks on the countershaft I, and communicate motion to it.

This shaft carries two loose pulleys P P', and a clutch, P², feathered to it, and provided with a reversing-lever, Q, whereby the motion may be transmitted through either of the said wheels to the axle of the driving-wheel A; also having two corresponding wheels P³ P⁴. Cords or belts, P⁵, are arranged on each set of these wheels, and two different speeds are thereby made available.

R represents a segmental steering-wheel, suspended at R¹, by a stud-pin on a post rising up from the platform. It is provided with handles R², projecting from each side of the machine, in front of the position of the operator.

The said wheel oscillates in a vertical plane, and is provided with cords R³, crossing each other, and passing over the guide-pulleys S, to an arm on the stem of the caster-wheel behind.

T represents the side-balancing rollers. They are arranged on cranked arms of a rock-shaft, T¹, having a spiral spring so arranged as to swing the said wheels upward, and to support them above the ground. The said shaft T¹ is provided with an arm, T³, and pointed hooked rod, T⁴, by which it is turned, when required, so as to bring the said wheels down to or near to the ground, and to hold them there by hooking upon a guide, T⁵.

This machine is calculated to be worked by the operator standing erect in the stirrup, so as to apply his whole weight to the work, treading as in a tread-mill. The spring-treadle arms are designed to prevent shocks upon the cranks at the end of the downward movement, and to aid in commencing the return movements of the feet.

The stirrups are pivoted, and provided with the radius-bars O, for the purpose of accommodating them to the natural requirements of the feet in the different stages of their movements; for instance, when the leg and foot are raised, the most natural tendency is to incline the foot downward, as the treadle is represented in fig. 4, and when the leg moves downward, in applying the force, it should gradually assume a level position.

By means of the handles of the steering-wheels, the operator is enabled to apply greater force at times, than his weight, by pulling himself downward against the treadles, which may sometimes be useful, for short periods of time, in going up steep inclines, or over muddy places.

Having thus described my invention,

What I claim as new, and desire to secure by Letters Patent, is—

1. The combination of the frame C, the stirrups, spring-treadle arms, rock-shaft, and countershaft, substantially as specified.

2. The combination on the frame $c$, between the fore and hind wheels, of the countershaft I, pulleys P P$^1$, sliding clutch and pulleys on the wheel A, when arranged substantially as specified.

3. The combination and arrangement of the sandals $a$, plates or frames $b$, and uppers, when the said frames or plates are pivoted to the treadle-arms, substantially as specified.

4. The combination, with the stirrups pivoted to the treadle-arms, of the radius-rods O, substantially as specified.

5. The combination, with the stirrups and rock-shaft, of spring-treadle arms, substantially as specified.

6. The combination, with the frame and the wheel B, of the segmental steering-wheel cords and guide-pulleys, when arranged substantially as specified.

7. The combination, with the frame $c$, of the cranked rock-shaft T$^1$, guide-rollers T, spring-lever and hooked arm, all substantially as specified.

8. A velocipede-frame, composed of two bent bars of wood, shaped, arranged, and secured together, substantially as specified.

The above specification of my invention signed by me, this 24th day of July, 1869.

GEO. D. EMERSON.

Witnesses:
 GEO. W. MABEE,
 EDWARD MARTIN.